H. L. CARTER.
LAWN EDGER.
APPLICATION FILED JAN. 15, 1908.
910,111.
Patented Jan. 19, 1909.
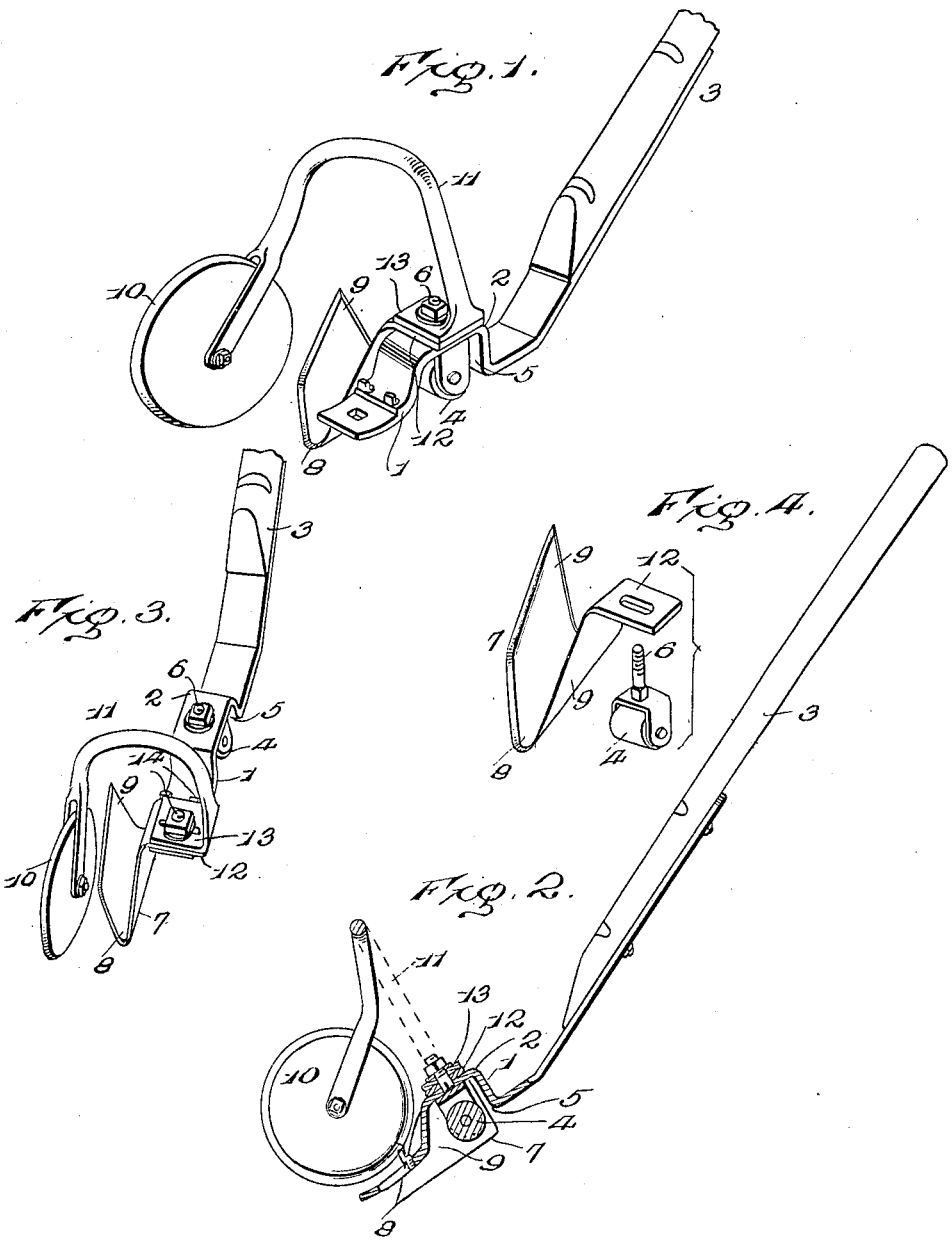
Inventor
Homer L. Carter

UNITED STATES PATENT OFFICE.

HOMER L. CARTER, OF TRAVERSE CITY, MICHIGAN.

LAWN-EDGER.

No. 910,111.  Specification of Letters Patent.  Patented Jan. 19, 1909.

Application filed January 15, 1908. Serial No. 411,018.

*To all whom it may concern:*

Be it known that I, HOMER L. CARTER, citizen of the United States, residing at Traverse City, in the county of Grand Traverse and State of Michigan, have invented certain new and useful Improvements in Lawn-Edgers, of which the following is a specification.

The present invention relates to an improved lawn edging device and has for its object to provide novel means for removing the grass which the lawn-mower fails to cut along the edge of the walk.

With this object in view the invention resides in a novel implement which operates both to trim the edge of the lawn so as to cause the same to present a neat appearance, and also to excavate a ditch along the edge of the walk, the said ditch serving to drain the walk and prevent the water from backing up on the same in rainy weather.

The invention will be found particularly desirable when employed in connection with cement walks having a crown at their central portion and draining towards opposite sides, since the ditches will carry away the water and prevent the same from overflowing the edges of the walk.

For a full understanding of the invention and the merits thereof and also to acquire a knowledge of the details of construction and the means for effecting the result reference is to be had to the following description and accompanying drawings, in which:

Figure 1 is a perspective view of a lawn edger embodying the invention. Fig. 2 is a longitudinal sectional view through the same. Fig. 3 is a perspective view of the lawn edger showing the ditching blade and rotary cutter as mounted upon the lower portion of the shoe. Fig. 4 is a detached perspective view of the ditching blade and roller.

Corresponding and like parts are referred to in the following description and indicated in all the views of the drawings by the same reference characters.

Referring to the drawings, the numeral 1 designates a shoe which is designed to travel along the edge of a walk or the like and which is provided with a ditching blade for excavating a furrow along the side of the walk and also with a cutting blade designed to operate upon the sod at the outside of the furrow. In the present instance the shoe 1 is shown as formed from a bar or elongated piece of material, an intermediate portion of the bar being bent upwardly as indicated at 2, while one of the extremities of the bar is deflected at an angle and has the handle 3 applied thereto by means of which the shoe can be moved either forwardly or rearwardly as may be found most desirable. A roller 4 is mounted within the upwardly deflected portion 2 of the shoe and serves to support the same and prevent undue friction between the shoe and the walk. This roller 4 is journaled within an inverted U-shaped frame 5 provided with a bolt 6 projecting upwardly through an opening in the top of the upwardly bent portion 2 of the shoe and capped by a nut for holding the frame securely in position.

The ditching blade 7 is adjustably mounted upon the shoe and projects upon one side of the same so that when the shoe is moved along the edge of a walk the ditching blade will operate to form a furrow adjacent to the walk. Specifically describing the blade 7 it will be observed that the same is longitudinally depressed and comprises an approximately horizontal bottom 8 and longitudinal sides 9, both ends of the ditching blade being sharpened and the rear end of the said blade being cut off square while the forward end is cut off at an angle and the sides are inclined rearwardly therefrom. In this manner a draw cut is obtained when the lawn edger is moved forwardly and the ditching blade 7 is enabled to readily sever any roots or like members as well as to excavate the soil. By moving the implement rearwardly the heel or rear end of the ditching blade which is cut off square, as previously mentioned, may be utilized for cleaning out a corner or like place which could not be readily operated upon by the forward edge of the blade.

The invention also contemplates a cutter operating parallel with the edge of the walk and serving to sever the sod at the outside of the ditch so that the edge of the lawn will present a neat appearance. This cutter is shown in the present instance as constituted by a rotary disk 10 having the periphery thereof sharpened and carried by a bracket 11 adjustably secured to the shoe 1. In attaching the ditching blade 7 and the bracket 11 to the shoe it will be observed that the former is provided with a perforated tang 12 and that the latter is provided in a somewhat similar manner with a laterally extending perforated ear 13. The tang 12 and ear 13 are designed to be secured to the shoe by means of the same bolt and may be either attached to the upwardly bent portion 2 of the shoe or to the forward end thereof which is at a lower elevation. In the former instance they are held in position by means of the bolt 6 of the roller frame 5, while in the latter instance they are held in position by means of a bolt 14. It will be readily apparent that when attached to the forward end of the shoe by means of the bolt 14 both the attaching blade and the rotary cutter will be at a lower elevation with respect to the shoe than when applied to the upwardly bent portion 2 thereof and will accordingly produce a deeper ditch. In this manner the implement can be readily adjusted so as to excavate either a shallow ditch or a deep ditch as may be found most desirable. Attention may also be directed to the fact that the rotary cutter blade 10 operates in advance of the outer side of the ditching blade 7 and serves to sever the sod in advance of the said ditching blade, thereby insuring that the edge of the lawn will be cut evenly and not left in a ragged condition.

Having thus described the invention, what is claimed as new is:

1. In a lawn edger, the combination of a shoe, a ditching blade detachably applied to the shoe, an independent bracket also detachably applied to the shoe, a single fastening member for securing both the ditching blade and the independent bracket to the shoe, and a cutter disk carried by the bracket in coöperative relation to the ditching blade.

2. In a lawn edger, the combination of a shoe, a roller frame provided with a bolt, a roller journaled upon the roller frame, and a ditching blade, both the ditching blade and the roller frame being secured to the shoe by means of the bolt upon the roller frame.

3. In a lawn edger, the combination of a shoe having an intermediate portion thereof bent upwardly, an independent roller frame arranged within the said upwardly bent portion of the shoe, a roller journaled upon the roller frame, and a ditching blade adapted to be attached either to one end of the shoe or the upwardly bent intermediate portion thereof.

4. In a lawn edger, the combination of a ditching blade, a shoe carrying the ditching blade and having an intermediate portion thereof bent upwardly, the said shoe being constructed to have the ditching blade applied either to one end thereof or the upwardly bent intermediate portion thereof, and a roller carried by the shoe and arranged within the upwardly bent portion thereof.

In testimony whereof I affix my signature in presence of two witnesses.

HOMER L. CARTER. [L. S.]

Witnesses:
CLAUDE L. CARTER,
ORAH E. CARTER.